(12) United States Patent
Dowell et al.

(10) Patent No.: US 6,277,769 B1
(45) Date of Patent: Aug. 21, 2001

(54) HIGH ENERGY FRICTION PRODUCT

(75) Inventors: Richard E. Dowell, Parma; Thomas F. Csarny, Solon, both of OH (US)

(73) Assignee: S.K.. Wellman Corp., Solon, OH (US)

( * ) Notice: Subject to any disclaimer, the term of this patent is extended or adjusted under 35 U.S.C. 154(b) by 0 days.

(21) Appl. No.: 09/305,762

(22) Filed: May 5, 1999

(51) Int. Cl.$^7$ .......................... B32B 27/04; B32B 27/12; B32B 5/02

(52) U.S. Cl. ........................ 442/101; 442/76; 442/179; 442/187

(58) Field of Search ............................. 442/187, 76, 101, 442/179

(56) References Cited

U.S. PATENT DOCUMENTS

| | | | |
|---|---|---|---|
| 4,268,467 | * 5/1981 | Wagner | 264/111 |
| 4,384,640 | * 5/1983 | Trainor et al. | 192/107 M |
| 4,656,203 | * 4/1987 | Parker | 523/155 |
| 4,700,823 | * 10/1987 | Winckler | 192/107 M |
| 5,662,993 | 9/1997 | Winckler | 442/101 |
| 5,952,249 | 9/1999 | Gibson et al. | 442/179 |

* cited by examiner

*Primary Examiner*—Elizabeth M. Cole
*Assistant Examiner*—Norca L. Torres
(74) *Attorney, Agent, or Firm*—Pearne & Gordon LLP

(57) ABSTRACT

A high temperature and energy capacity friction material for wet brake and clutch applications comprising a resin impregnated carbon fabric. Preferably, the fabric is a woven cloth and the resin is a thermoset such as phenolic resin. The invention involves the controlled impregnation of the fabric so as to leave the fabric with a high compressive strength, effectively impervious to internal oil flow, but with macroscopic voids between the tows of yarn to afford local reservoirs of oil at the working surface and flow of oil across the working surface.

15 Claims, 5 Drawing Sheets

HIGH ENERGY FRICTION PRODUCT

BACKGROUND OF THE INVENTION

Certain machinery, particularly in large mining, construction and like vehicles, severe conditions can be imposed on friction materials used in transmissions and brakes. To dissipate friction generated heat in these applications, it is known to circulate cooling oil across the faces of the friction material and opposing plate. Known premium friction products for these applications have included so-called "paper" based materials. Paper friction materials in wet applications are capable of handling energy densities of, for example, 150 to 200 joules/cm$^2$. As equipment gets larger, heavier, and/or faster, there is a need for higher performance friction materials.

SUMMARY OF THE INVENTION

The invention provides a friction material composite that affords much greater performance than has been achieved with other known commercial materials. In the disclosed embodiment, the composite material is a carbon fiber fabric preferably woven and critically saturated with a resin such as phenolic resin.

It has been found that, surprisingly, when such fabric is saturated with the appropriate relative amount of resin, energy density capacity is far greater than has been experienced with prior commercial materials. In accordance with the invention, the resin loading is sufficient to wet the fibers and adhere them to any contacting or closely adjacent fibers. The resulting composite material is relatively impervious to any flow of cooling oil through it, but has sufficient macro surface irregularities to support pockets of cooling oil at its working surface. Since the friction material of the invention is several times more effective than prior materials, drive or brake assemblies using this material can be reduced in size and weight and/or much longer service life can be obtained where desired.

DESCRIPTION OF THE PREFERRED EMBODIMENT

Figure 1:
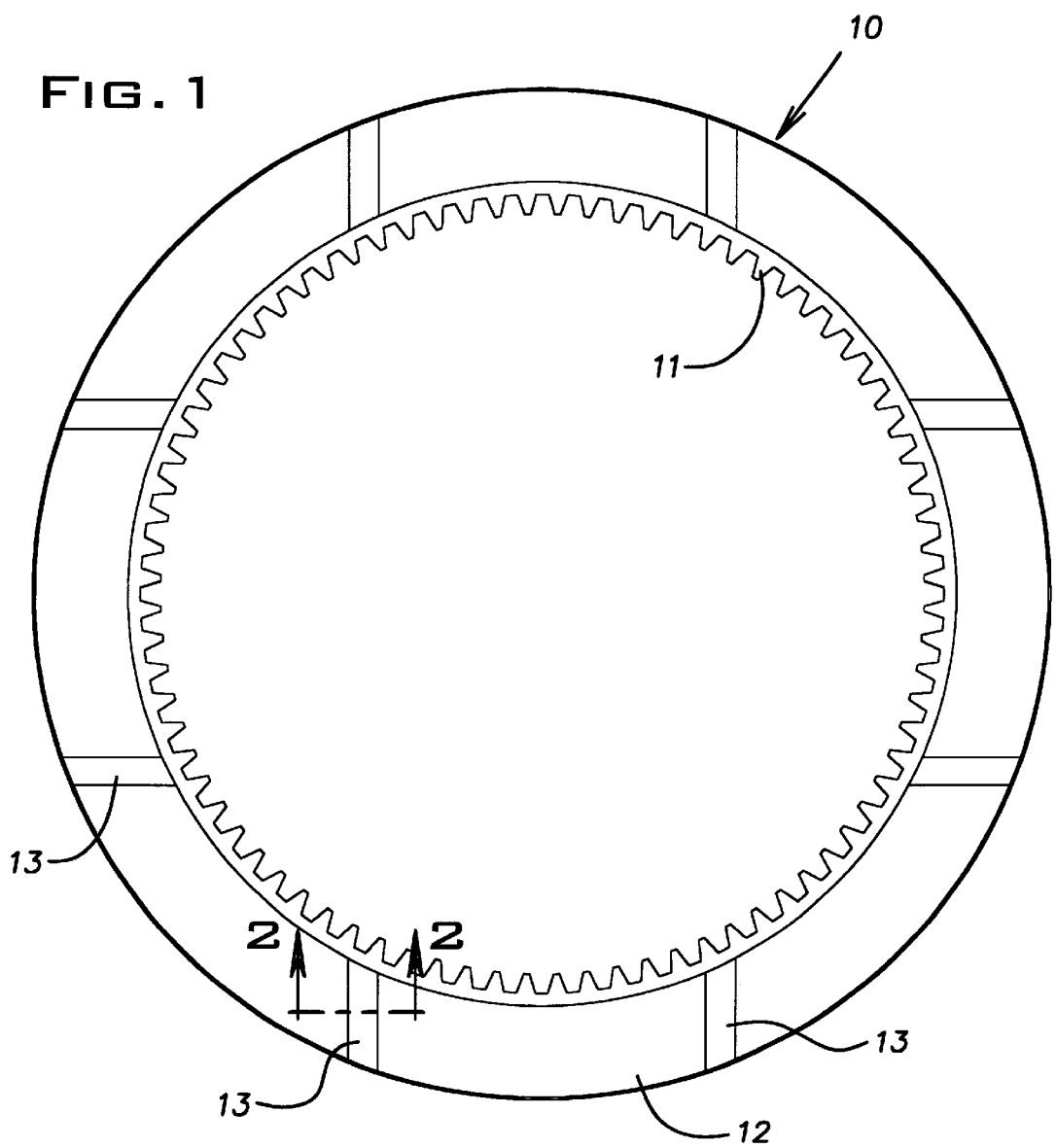
FIG. 1 is a face view of a friction disc assembly constructed in accordance with the invention.
Figure 2:
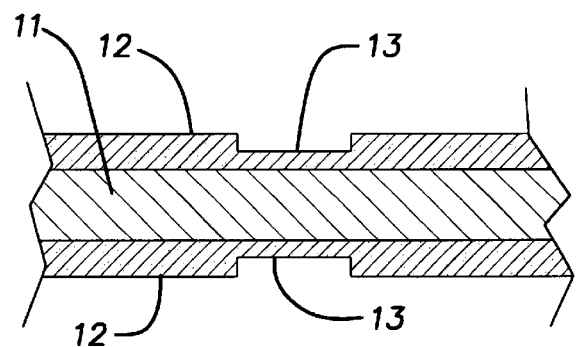
FIG. 2 is a fragmentary cross-sectional view of the friction disc assembly taken in the plane indicated at 2—2 in FIG. 1.

With reference to FIGS. 1 and 2 there is shown a friction article 10 in the form of a clutch or brake disc. The illustrated disc 10 is generally conventional in shape and includes an annular base or core 11 preferably stamped from sheet steel or other metal and friction material 12 in an annular pattern on both faces of the core. The illustrated friction material is carbon fiber fabric saturated with a thermosetting resin. More specifically, the fabric is preferably a plain woven fabric formed by strands of twisted yarn bundles, in turn, made from spun carbon fibers. The fabric weight, unsaturated, is between about 6.0 oz. and about 17 oz. per square yard. The thickness of the material 12 is generally proportional to the weight of the cloth. A suitable carbon-based friction material of the type described is available from Textron Specialty Corp., Lowell, Massachusetts.

The carbon fiber fabric, in accordance with the invention, is saturated in a critical manner with a suitable resin such as phenolic resin. It has been found that for woven carbon fiber fabric and phenolic resin, the final composite friction material 12 should comprise resin, in a dried state, in an amount where the resin weight represents from about 41% to about 60% of the weight of the resin and fabric together. The fabric is preferably saturated with resin by immersing it in a bath of solvented resin. Where the resin is a phenolic, a suitable solvent such as an alcohol, for instance ethanol or isopropyl alcohol, can be used.

The solvent/resin ratio can be regulated to control the final weight percentage content of resin in the friction material. The higher the relative solvent content in the bath in which the fabric is immersed, the lower the amount of resin content that will be produced in the finished friction material and vice versa. The resin saturated fabric is dried by removal of the solvent. Depending on the weight of the fabric used, the friction material, comprising a single fabric ply, can have a thickness of between about 0.50 mm to about 1.3 mm. The fabric is cut to shape before or after it is largely heat cured. The cut shape of the friction material 12 can be a complete circumferentially continuous annulus or may be sections that are assembled into an annulus corresponding to the annulus shape of the friction material 12 in FIG. 1.

The friction material 12 is bonded to the metal core 11 preferably in the following manner. A coating of phenolic or epoxy resin is applied to each side of the steel core to a thickness of between about 0.003 to 0.0015 in. This coating of resin is advanced or "B" staged. A film adhesive such as a phenolic film in sheet form blanked to an annular shape corresponding to the shape of the friction material 12 is positioned between the coated core 11 and friction material 12 on each side of the core. The resulting sandwich formed by the two outside layers of friction material 12, two adjacent layers of the film adhesive and the central core 11 with resin coated on both sides is then bonded together under heat and pressure. Before being bonded to the core, the friction material is nearly fully cured, for example, by as much as 90 or 95%.

After the friction material 12 is bonded to the core 11, the resulting assembly can be cooled and suitably grooved. Grooves 13 are cut across the face of the friction material 12 at both sides of the article 10. Such grooves, for oil distribution, can be cut with a suitable cutter wheel. The grooves are square or rectangular in cross-section and have a depth up to about half the thickness of each layer of friction material. The following table gives examples of suitable groove or slot patterns and sizes for various size friction discs. FIG. 1 illustrates a Wagon Track pattern.

TABLE

| Groove Pattern | | Groove Width |
|---|---|---|
| BELOW 9" OUTSIDE DIAMETER | | |
| Radial: | 6 equally spaced (60° apart) | 3.17 mm |
| | or | |
| Radial: | 6 equally spaced (60° apart) | 2.30 mm |
| | or | |
| Wagon Track: | two passes - two grooves per pass | 3.17 mm |
| | or | |
| Wagon Track: | two passes - two grooves per pass | 2.30 mm |
| 9" OUTSIDE DIAMETER AND ABOVE | | |
| Radial: | 12 equally spaced (30° apart) | 3.17 mm |
| | or | |
| Radial: | 12 equally spaced (30° apart) | 2.30 mm |
| | or | |
| Wagon Track: | two passes - two grooves per pass | 3.17 mm |
| | or | |
| Wagon Track: | two passes - two grooves per pass | 2.30 mm |

It is believed that when the resin content is between about 41% to about 60% of the total weight of the resin and carbon fiber of the friction material 12, an optimum balance of strength and oil retention and distribution capacity is obtained and, consequently, maximum energy capacity is obtained. Friction articles made according to the invention have demonstrated energy absorption capabilities 2 to 3 times that of conventional paper friction materials. For example, the friction article 10 described above has operated successfully in the range of 500–600 joules/cm$^2$ per engagement cycle.

Figure 3:
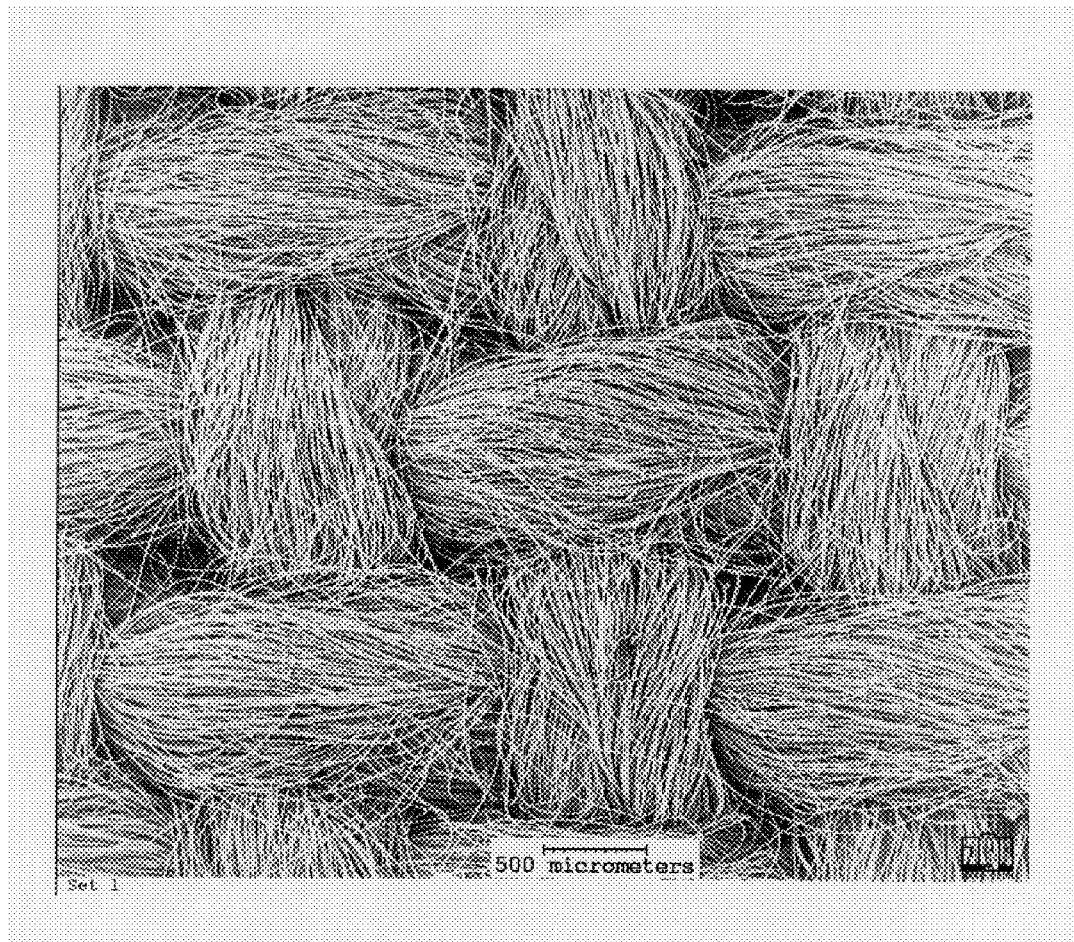
FIG. 3 is a scanning electron micro photograph of unsaturated carbon fiber woven cloth prior to resin impregnation.
Figure 4:
FIG. 4 is a scanning electron micro photograph of strands in tows of the yarn woven into the cloth of FIG. 3 prior to resin impregnation.
Figure 5:
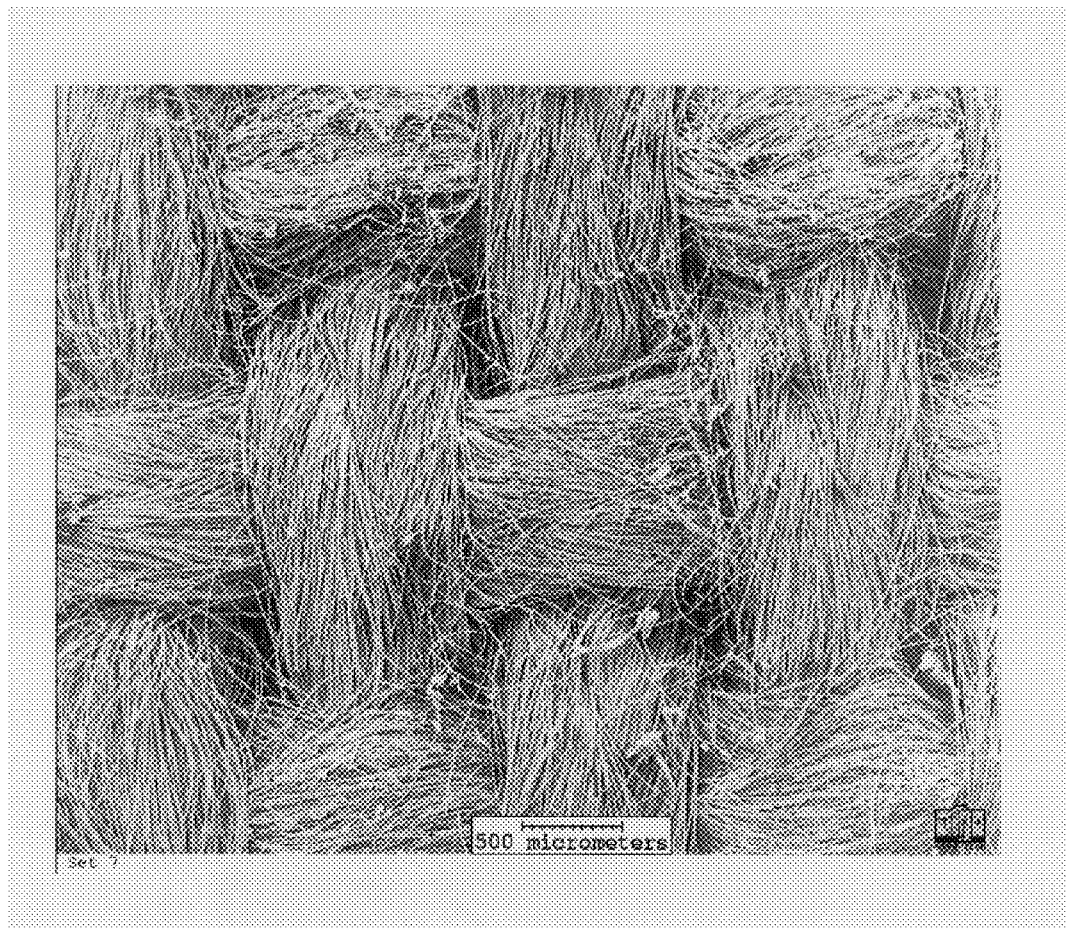
FIG. 5 is a scanning electron micro photograph of carbon fiber woven cloth saturated with resin in accordance with the invention.
Figure 6:
FIG. 6 is a scanning electron micro photograph of strands in tows of the yarn woven into the resin impregnated cloth of FIG. 5.

FIGS. 3–6 illustrate, by comparison, an example of the degree of resin impregnation that has been found to produce the surprisingly high energy capacity of the invention. FIGS. 3 and 4 are different magnifications of the surface of a typical carbon fiber woven cloth useful with the invention prior to resin impregnation. FIGS. 5 and 6, at magnifications corresponding to FIGS. 3 and 4, respectively, illustrate the same fabric after it has been impregnated with phenolic resin to a degree where the resin weight, in a dried state, is between about 41% to about 60% of the weight of the combined resin and fabric. It can be seen in FIG. 5 that the space between the tows of yarn is largely void so as to leave on a macroscopic level a large number of oil reservoirs at the surface and channels for fluid flow around the tows of yarn. FIG. 6 illustrates that all of the strands of the carbon fiber are coated with resin and the areas between adjacent strands is typically filled with resin so as to effectively eliminate microporosity and the ability of oil to flow through the friction material thereby assuring that oil delivered to the working surface through the grooves 13, for example, will stay at the working surface of the friction material.

The disclosed friction material exhibits performance levels measured by its capacity to sustain repeated cycles of energy absorption, quantified in dissipated energy per area per cycle, far in excess of that produced by conventional known materials such as paper friction materials. The friction material can safely operate at temperatures that exceed the temperature limits of ordinary cooling fluids. The friction material has demonstrated an ability to maintain the operating temperatures of the reaction plates against which it operates at a generally uniform level from inside diameter to outside diameter and thereby reduces the risk of warpage of such plates. Still further, the disclosed friction material resists glazing of its working surface even at severe use so that its performance characteristics do not change during its service life and engineers can confidently use a working design load that is close to the ultimate capacity of the friction material.

At resin impregnation weights below that described herein, a friction product can suffer from limited compressive strength and microporosity. High compressive strength obtained with the invention is important in operating at high unit pressures and, consequently, high energy dissipation levels. Microporosity, which is avoided by the resin weights contemplated by the present invention, it is believed, can limit performance by allowing oil to dissipate through the friction material from the working surface where it is most effective. Resin impregnation weights above those described for the invention herein evidence a decrease in performance which is believed to be the result of the macroporosity at the surface being reduced and a tendency of the friction material to clog up with cooling oil debris created when such oil overheats and begins to carbonize. This condition excludes the beneficial existence of pockets of oil that aid in maintaining a sufficient quantity of oil at the working surface to support cooling action and leads to premature failure.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What we claim is:

1. A friction product comprising a flat core sheet and friction material bonded to both sides of the core sheet, the core being formed of steel and being circular in shape, the friction material having an annular shape concentric with the center of the core, the friction material comprising a cloth fabric woven from strands made of carbon fiber and impregnated with phenolic resin, the resin being present in the fabric to impart compressive strength to the fabric by substantially reducing porosity and substantially eliminates permeability of the fabric to oil flow through the body of the fabric, but leaves sufficient voids between the tows of the fabric yarn to retain limited amounts of oil and permit limited flow of oil on and across the working surface of the friction material whereby the friction material is capable of extended cycles of energy absorption in the range of about 500 to 600 joules/cm$^2$ without glazing or other degradation.

2. A friction product suitable for wet clutch or brake applications comprising a fabric made of carbon fibers and impregnated with a thermosetting resin, the weight of the resin being between about 41% to about 60% of the combined weight of resin and fabric whereby the fabric is substantially impervious to cooling oil flow through its body.

3. A friction product as set forth in claim 2, wherein the fabric is woven from strands made of carbon fiber.

4. A friction product as set forth in claim 2, wherein the resin is a phenolic resin.

5. A friction product as set forth in claim 2, wherein the weight of the fabric is between about 6 oz. and about 17 oz. per square yard.

6. A wet service friction product comprising a metal core and a friction material bonded to the core, the friction material comprising a woven fabric made from strands formed by carbon fibers and a phenolic resin impregnated in the fabric, the weight of the resin comprising from about 41% to about 60% of the combined weight of the resin and fabric, the volume of resin being sufficient to substantially completely coat the strands and render the material substantially impervious to oil flow through its body, but being sufficiently limited to leave voids between the strands whereby a limited amount of oil can exist in said voids and flow across a working surface of the friction material.

7. A friction product as set forth in claim 6, wherein said working surface is slotted for circulation of oil.

8. A friction product comprising a flat core sheet and friction material bonded to both sides of the core sheet, the core being formed of steel and having a circular shape, the friction material having an annular shape concentric with the center of the core, the friction material comprising fabric made from carbon fiber and impregnated with phenolic resin, the weight of the resin being from about 41% to about 60% of the combined weight of the fabric and resin, the resin content being sufficient to substantially eliminate porosity in the friction material and substantially eliminate cooling oil flow through the body of the friction material.

9. A friction product as set forth in claim 8, wherein the fabric is woven of strands made from carbon fiber.

10. A friction product as set forth in claim 8, wherein the fabric on each face of the core is a single ply.

11. A friction product as set forth in claim 10, wherein the weight of the fabric is from about 6 oz. to about 17 oz. per square yard.

12. A friction product as set forth in claim 10, wherein the friction material on each face of the core has its working surface interrupted with grooves.

13. A friction product as set forth in claim 12, wherein said grooves extend from an inside diameter of the friction material to an outside diameter of the friction material.

14. A friction product as set forth in claim 13, wherein said grooves are cut into friction material to a depth of about ½ or less of its thickness.

15. A friction product as set forth in claim 14, wherein the friction material has a thickness in the range of about 0.5 and about 1.3 mm.

\* \* \* \* \*